WASTE DISPOSAL SYSTEM

Original Filed May 10, 1965 2 Sheets-Sheet 1

WASTE DISPOSAL SYSTEM

Original Filed May 10, 1965 2 Sheets-Sheet 2

INVENTOR
JAMES S. REID
BY
Meyer, Baldwin, Doran & Egan
ATTORNEYS

United States Patent Office

Re. 26,891
Reissued May 26, 1970

26,891
WASTE DISPOSAL SYSTEM

James S. Reid, Hudson, Ohio, assignor to The Standard Products Company, Cleveland, Ohio, a corporation of Ohio Original No. 3,342,337, dated Sept. 19, 1967, Ser. No. 454,416, May 10, 1965. Application for reissue Apr. 3, 1969, Ser. No. 817,609
Int. Cl. B01d *21/24*
U.S. Cl. 210—152 13 Claims

Matter enclosed in heavy brackets [ ] appears in the original patent but forms no part of this reissue specification; matter printed in italics indicates the additions made by reissue.

*ABSTRACT OF THE DISCLOSURE*

*A waste disposal system, primarily for vehicular units, which employs waste heat to vaporize the effluent from a septic tank. The heated exhaust gases from the vehicle's engine is the preferred source of waste heat with the liquid waste being injected into a dissipatus drum which surrounds the exhaust pipe and in which the liquid is vaporized.*

Figure 1:
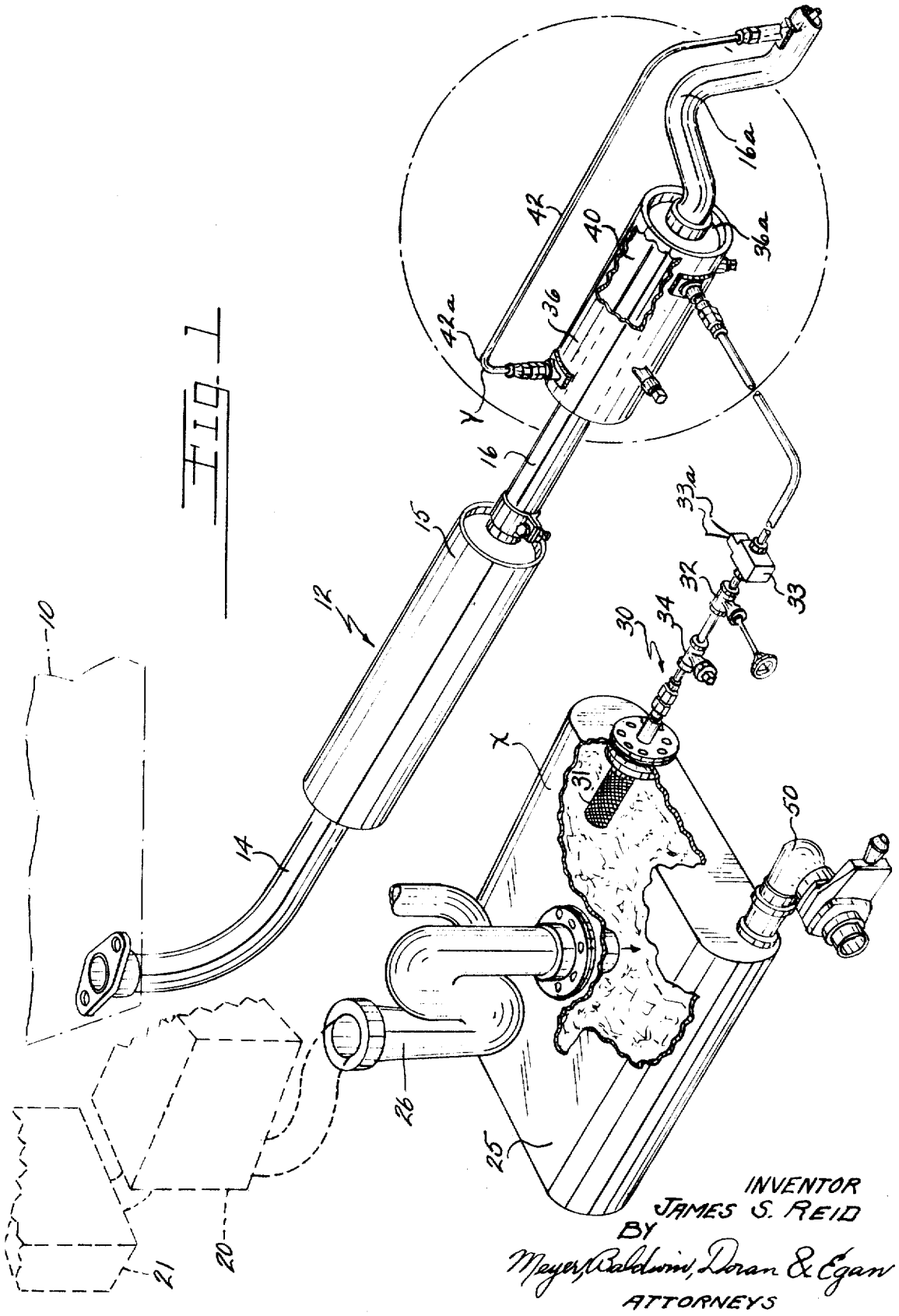

This invention relates generally to improvements in waste disposal systems and more particularly to a disposal system especially designed for the disposal of human waste and/or other like disposable waste products.

Although not limited thereto, the waste disposal system of the present invention has particular utility for use in vehicular units such as buses, trucks, the more recently developed motor homes, house trailers, boats and various other types of vehicles utilized for human transportation.

However, as will be hereinafter apparent, the instant disposal system may also find utility in domestic housing installations or the like where a conventional sewage system such as presently in use in large municipalities is not available.

Heretofore, in waste disposal systems especially designed for use in vehicular units and the like, one of the more important factors which has limited the range and/or the use of such vehicle for extended transportation, is the fact that said systems merely accumulate or collect the waste material, and consequently, inasmuch as said systems therefor have a limited capacity and period of use, the vehicle associated therewith likewise is comparatively limited for its intended purpose.

Still another limiting factor in the use of presently available vehicle disposal systems is that it must function as a completely self-contained unit to prevent any harmful waste material and/or odors from being discharged into atmosphere. This is particularly true in land type vehicles and likewise in water borne craft where laws have been established to prevent the discharge of waste material into the atmosphere and/or public bodies of water.

In view of the above disadvantages among others known to the art, the use of such systems has been obviously limited.

In contrast thereto, the waste disposal system of the present invention is particularly applicable for use in vehicular units and the like and is operable over extended periods of time without any evidence of an accumulation of waste material which would limit its period of use. Further, the instant waste disposal system is a completely self-contained unit whereby its operation prevents any contaminants from being discharged into the atmosphere.

It is therefore a primary object of the invention to provide a waste disposal system especially designed for use in vehicular transportation devices to provide for the disposal of human waste products and/or the like while in transit and which is a completely self-contained unit to thus prevent any waste products from being directly discharged into the atmosphere.

Another object of the present invention is to provide a new and improved waste disposal system especially designed for use in vehicular types of units and wherein the said system is operable to provide for the disposal of human waste products and/or the like over an extended period of time to thereby permit its associated vehicle to be used as what is commonly referred to in the art as a self-contained housing unit over an extended period and range of use.

Figure 2:
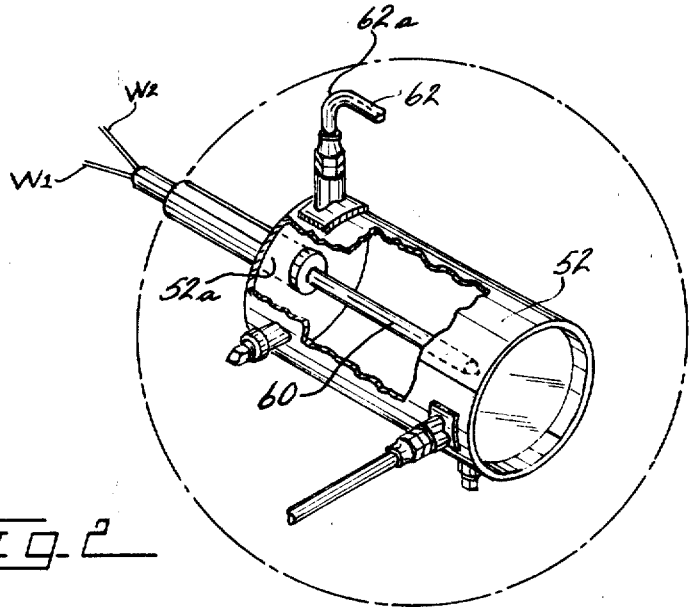
Figure 3:
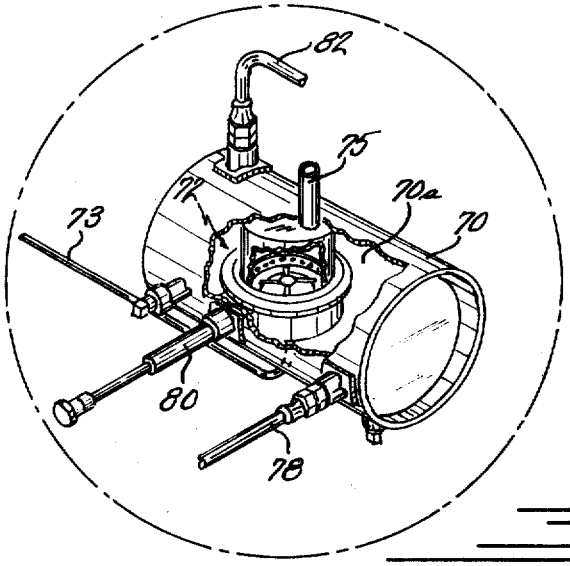

Additional objects and advantages of the waste disposal system of the present invention will be apparent to one skilled in the art to which it pertains and upon reference to the several preferred embodiments thereof as are described in detail in the following description and which are illustrated in the accompanying drawings wherein FIG. 1 is a perspective view of one embodiment of waste disposal system incorporated for use in a vehicular unit which provides a source of heat in the form of exhaust gases flowing through an exhaust conduit system;

FIG. 2 is a fragmentary perspective view of a second embodiment of dissipatus drum assembly for use in the disposal system of FIG. 1; and, FIG. 3 is a third embodiment of a dissipatus drum assembly which utilizes a gas burner unit disposed therein as the source of heat energy.

With reference directed to FIG. 1, the waste disposal system with the present invention is herein illustrated as adapted for use with a vehicle unit such as a bus, motor home, boat or the like and which includes a source of motive power such as a gasoline engine diagrammatically shown at 10 which has an exhaust assembly 12 for discharging the by-products of combustion from said engine to atmosphere.

The exhaust assembly 12 as shown in its present form includes an exhaust conduit 14 connected at one end to the motor 10, and at its opposite end to an elongate muffler device 15 of conventional construction. The opposite end of the muffler is seen to be connected to one end of tailpipe conduit 16, said conduit, adjacent its opposite end, being formed with an upwardly projecting bend 16a which is somewhat of inverted U-shaped configuration.

As will be understood, the hot exhaust gases emerging from motor 10 are passed through conduit 14 and into the muffler 15 wherein the same are dispersed in the latter to muffle the sound created thereby, said exhaust stream thereafter passing through tailpipe conduit 16 to atmosphere in the conventional manner.

As will be described herein the hot exhaust gases passing through the tailpipe conduit 16 are utilized to vaporize the fluids produced in the waste disposal system in such manner as to cause the same to be sterilized and thereafter mixed with the exhaust stream and dispersed with the same to atmosphere.

As seen in FIG. 1, the waste disposal system includes the usual water closet as depicted at 20 which is located in the lavatory of the vehicle unit and disposed to receive human waste products therein. A suitable flush tank 21 is connected to said water closet and disposed thereabove and filled with a source of water or other fluids capable of flushing the waste products from said water closet 20 to and into a waste tank as shown at 25.

The waste tank 25 may be conveniently located exteriorly of the body of the vehicle unit so as to be readily available for cleaning, maintenance and the like.

As herein shown, the waste tank 25 is connected through a waste trap conduit 26 of conventional construction to the water closet 20.

As will be apparent, the trap conduit 26 is somewhat

S-shaped in its configuration so as to retain a portion of the flushing fluid in its lower bend to prevent odors from backing up and into the interior of the vehicle.

The waste tank 25 is a closed receptacle and receives the waste products and flushing fluid. Said tank is constructed to function as a conventional septic tank whereby, as is well known, solid materials are digestively attacked by anaerobic organisms, thereby being turned ultimately with said fluid into a partially purified fluid solution. An outlet conduit assembly as seen at 30 is connected at its one end to the waste tank 25 by means preferably of a suitable screen type filter 31. Said filter is located inside the waste tank to define a liquid level wherein a substantially complete anaerobic process therein may be performed upon the solid waste materials, while preventing any solids to escape from said tank.

The outlet conduit assembly is also seen to include a suitable shutoff valve 32, an in-line liquid pump 33 connected by conductors 33a to the vehicle electrical system (not shown), and a conventional T-fitting 34 utilized to enable a cleaning fluid to be passed through the tank in the event periodic maintenance and/or cleaning thereof is desired.

The opposite end of the outlet conduit assembly 30 is connected into the wall of a cylindrical drum 36 hereinafter referred to as a dissipatus drum which is seen to be placed over and to surround a section of the tailpipe conduit 16, the end walls 36a of said tank being rigidly secured to said conduit by welding or the like to define a closed annular heating chamber 40 therein. A dissipatus tube as identified at 42 has its one end attached to the top of the drum 36 in communication with the heating chamber 40, said tube extending upwardly from said connection and thence angulating downwardly and longitudinally along the tailpipe conduit 16, and over and beyond the upwardly projecting portion 16a of the latter, and then downwardly at substantially a right angle whereby its opposite end is connected into said tailpipe conduit 16 at a point downstream said upwardly extending projecting portion 16a in the direction of the gas exhaust stream.

To facilitate gravity flow of fluid from the waste tank 25 to the dissipatus drum 36, the waste tank is mounted on the vehicle such that the conduit assembly 30 angulates in the direction toward the dissipatus drum. Further, to prevent the fluid from the waste tank 25 from flowing out of the dissipatus drum, the tank 25 is mounted on the vehicle such that its upper wall X is at or below the point Y in the bend of the dissipatus tube 42.

With this assembly, and with an exhaust gas stream passing through the exhaust conduit assembly 12, when the fluid level in the waste tank 25 is raised above the filter outlet conduit of said tank by reason of flushing fluid being introduced into the water closet and into said waste tank, a quantity of overflow fluid solution flows through said filter outlet conduit into the dissipatus drum 36 as will be understood, the quantity of said overflow solution is determined by the level or height in the tank chamber of said outlet conduit.

With a hot gaseous exhaust stream passing through the tailpipe conduit 16, the temperature of the drum chamber 40 is raised to such an elevated level as to cause the fluid solution to boil and substantially vaporize, being thereby purified.

The resulting vapor rises in said chamber and escapes therefrom through the dissipatus tube 42. As the vapor rises in said tube it becomes cooled and reverts partially or substantially completely into fluid form.

With the dissipatus tube angulating downwardly from left to right as viewed in FIG. 1, the resulting fluid therein flows gravitationally toward the right and is directed into the exhaust stream beyond the conduit bend 16a by the velocity of said stream whereby it is mixed with said stream and dissipated into atmosphere with the latter. Inasmuch as the resulting fluid from said dissipatus drum is purified, its discharge with the gaseous exhaust stream into atmosphere does not create any hazards to health.

As shown in FIG. 1, the aforementioned electric pump 33 may be utilized if it is decided that the gravitational flow of liquid solution from the waste tank 25 to the dissipatus drum 36 is insufficient to maintain the operation of the disposal system at its highest efficiency.

Additionally, with the point Y on the dissipatus tube at the same or higher level with respect to the upper wall X as aforementioned, any liquid solution is also prevented from passing out through the dissipatus tube 42 in a liquid nonpurified state to atmosphere.

Likewise, as herein shown, with the dissipatus tube 42 connected into the tailpipe conduit 16 downstream thereof from the upwardly projecting bend 16a the level of said bend being above said connection prevents any liquid from flowing backwardly through the exhaust conduit assembly 12 and into the interior of the vehicle, said tailpipe conduit bend 16a thus also defining a liquid trap.

As is likewise shown in FIG. 1, the waste tank 25 is provided with a drain 50 communicating with the tank chamber preferably adjacent the bottom of said tank to thus facilitate cleaning of the same.

As herein shown in FIG. 1, the waste disposal system is connected to the exhaust system of the vehicle on which the disposal unit is mounted. However, as will be apparent, the exhaust system or equivalent unit for causing a vaporization of the fluid output from the waste tank 25 may be on one vehicle such as an automobile, truck or the like which pulls a second vehicle such as a house trailer in which the waste tank 25 and water closet 20 are carried. In this instance the outlet conduit assembly 30 of the waste tank 25 is extended to the pulling vehicle and connected to the dissipatus drum 36 mounted on the exhaust assembly 12 of the pulling vehicle.

With reference now directed to FIG. 2, a modified form of dissipatus drum assembly is shown, being identified by the reference numeral 52, and which is seen to use an electrical source of energy to heat the dissipatus drum. Specifically, the electrical energy source is preferably a calrod type of unit of conventional form, identified at 60, said calrod penetrating one end wall 52a of the dissipatus drum 52 and extending longitudinally therethrough said calrod being of sufficient length to provide uniform heat to the drum chamber.

A suitable source of electrical energy, not shown, is intended to be connected to said calrod unit by conductors w1 and w2.

The dissipatus tube 62 may connect into the tailpipe conduit assembly as in the previous embodiment or in the event the instant disposal system is used in a permanent residence, said tube may be terminated shortly beyond the bend 62a thereof whereby the purified liquid and/or vapor issuing therefrom is directed to any suitable liquid receptacle or other device used for surface run-off water.

In FIG. 3, is shown still another embodiment of dissipatus drum assembly 70 and which uses a conventional gas burner unit 72 to provide heat to its chamber 70a and which is connected to a suitable source of fuel by conduit 73 such as for example the gas tank of the automobile on which the unit is mounted.

The gas burner 72 is preferably disposed centrally within the dissipatus drum chamber and has a vent tube 75 projecting upwardly out of said chamber to provide for venting to atmosphere the by-products of combustion of the fuel used in said burner 72.

The liquid solution from the waste tank is connected to the dissipatus drum 70 by means of conduit 78 as in the previous embodiments whereby the liquid solution is directed to the drum chamber 70a of said drum.

The burner unit 72 is likewise seen to preferably include a pump-type of air generator 80 which enables the gaseous fuel connection through conduit 73 to the said unit 72 to be aerated in the usual manner upon its entry into the drum chamber.

Although not herein shown, the gas burner unit 72 may be equipped with any conventional ignition controls to start its burner such as in igniter or electrical pilot controls manually operable to start the unit into operation.

As will be realized, as the gas burner is ignited sufficiently to raise the temperature of the dissipatus drum chamber 70a the liquid solution therein will be turned or transformed into a vapor and likewise purified by said burning action, said vapor rising within the said drum chamber 70a and exiting therefrom through the dissipatus tube 82 which is of similar configuration to the previous embodiments of the dissipatus tube 42 and/or 62.

Having described several embodiments of a waste disposal system in accordance with the present invention, it will be realized that the same is susceptible to various modifications, combinations and arrangements of components without departing from the invention concepts that are depicted in the claims.

What is claimed is:

1. A waste disposal system for use in a vehicular unit for human transportation having a source of motive power and an exhaust system therefor, a water closet for receiving human waste material, a waste tank connected to said closet, a source of conveying fluid connected to said closet and operable to carry said waste material into said tank, means in said tank for producing anaerobic bacteriological action on said waste material effective to convert said material to a fluid state, container means, conduit means connecting said tank to said container means for delivering fluid from said tank to said container means, said exhaust system including means for heating said container means effective to vaporize the liquid therein, and means connected to said container means for directing said generated vapor into the exhaust system of said vehicular unit whereby said vapor is discharged to atmosphere.

2. A waste disposal system as defined in claim 1, wherein said exhaust system includes conduit means for directing hot exhaust from said motive means as a stream to atmosphere and wherein said exhaust stream is in heat transfer relation to said container means for the heating of said container means and wherein the vapor directing means is a conduit means.

3. A waste disposal system as defined in claim 2, wherein the vapor directing conduit means has a substantial portion thereof in spaced relation to said container and the conduit means of said exhaust system, whereby at least some of the vapor in said spaced portion of said vapor directing means is liquified before its discharge to atmosphere.

4. A waste disposal system as defined in claim 1, wherein the conduit means connecting the waste tank to the container means includes means communicating with said waste tank to define a predetermined fluid level therein and wherein said communicating means is operable to deliver a quantity of overflow fluid from said waste tank to said container means.

5. A waste disposed system for use in a vehicular unit for human transportation having a source of motive power and an exhaust system therefor, a water closet for receiving human waste material, a waste tank connected to said closet, a source of conveying fluid connected to said closet and operable to carry said waste material into said tank, means in said tank for producing anaerobic bacteriological action on said waste material effective to convert said material to a fluid state, said exhaust system including conduit means for directing hot exhaust from said motive means as a stream to atmosphere, container means surrounding said conduit means and heated by said exhaust, second conduit means connecting said waste tank to said container means and including means communicating with said waste tank to define a predetermined fluid level therein, said communicating means being operable to deliver a quantity of overflow fluid from said tank to said container means, said fluid being heated by said exhaust and vaporized in said container means, and means connecting said container means to said conduit means of said exhaust system for directing said vapor into said exhaust stream to be dispersed therewith to atmosphere.

6. A waste disposal system for use in a vehicular unit for human transportation having a power source generating waste heat, and an exhaust system therefor, a water closet for receiving human waste material, a waste tank connected to said closet, a source of conveying fluid connected to said closet and operable to carry said waste material into said tank, means in said tank for producing anaerobic bacteriological action on said waste material effective to convert said material to a fluid state, container means, conduit means connecting said tank to said container means for delivering fluid from said tank to said container means, said exhaust system including means for heating said container means effective to vaporize at least most of the liquid therein, and means connected to said container means for effecting the discharge of said generated vapor.

*7. A waste disposal system as defined in claim 6, wherein said power source comprises a fluid fuel burner means.*

*8. A waste disposal system for use in a vehicular unit for human transportation having a source generating waste heat, and an exhaust system therefor,*

*a waste tank for receiving waste material and in which bacteriological action occurs to convert solids to a liquid state,*

*container means,*

*conduit means connecting said tank to said container means for delivering liquid from said tank to said container means,*

*said exhaust system including means for heating the liquid in said container means effective to vaporize at least most of the liquid therein, and*

*means connected to said container means for effecting the discharge of said generated vapor.*

*9. The waste disposal system of claim 8 wherein said discharge means discharges the vapors into the exhaust system.*

*10. A waste disposal system for use in a vehicular unit for human transportation having a source of motive power and an exhaust system for disposing of the waste gases generated by the power source,*

*a waste tank for receiving waste material and in which bacteriological action occurs to convert solids to a liquid state,*

*container means,*

*conduit means connecting said tank to said container means for delivering liquid from said tank to said container means,*

*heating means for vaporizing the liquid delivered to said container means, and*

*means connected to said container means for effecting the discharge of the generated vapors into the exhaust system of said vehicular unit whereby said vapor is discharged to the atmosphere.*

*11. A waste disposal system for use in a conveyance for human transportation, said system comprising:*

*a waste tank adapted to be carried by the conveyance for receiving waste material and in which bacteriological action occurs to convert solids to a liquid state,*

*container means,*

*conduit means connecting said tank to said container means,*

*said conduit means cooperating with said tank to transmit liquid from said tank to said container means independent of the speed of the conveyance,*

*a source capable of generating heat,*

*said container means cooperating with said source for using at least some of the heat generated by said source for vaporizing the liquid transferred by said conduit means to said container means,*

*said container means including means for discharging*

*substantially only vapors from said container means, said source, container means and discharging means being capable of operating to vaporize liquids while the conveyance is in motion thereby to reduce the level of liquid in said tank.*

*12. A waste disposal system for use with a power source which performs useful work and which generates waste heated gases as a by-product of its operation, said power source including an exhaust system for disposing of said waste gases,*

*a waste tank for receiving waste material and in which bacteriological action occurs to convert solids to a fluid state,*

*container means,*

*conduit means connecting said tank to said container means for delivering liquid from said tank to said container means,*

*said exhaust system including means for heating the liquid in said container means whereby said liquid is vaporized, and*

*means connected to said container means for effecting the discharge of said vapors.*

*13. The waste disposal system of claim 12 wherein said discharging means discharges said vapors into said exhaust system.*

References Cited

The following references, cited by the Examiner, are of record in the patented file of this patent or the original patent.

UNITED STATES PATENTS

| | | | |
|---|---|---|---|
| 932,823 | 8/1909 | Smith | 4—8 X |
| 2,768,386 | 10/1956 | Graef et al | 4—131 |
| 2,921,681 | 1/1960 | Toulmin | 210—71 |
| 2,938,630 | 5/1960 | Novak | 210—181 X |
| 2,998,139 | 8/1961 | Novak | 210—71 X |

JOHN W. ADEE, Primary Examiner

U.S. Cl. X.R.

210—181, 260